(12) United States Patent
McMillan et al.

(10) Patent No.: US 7,021,072 B2
(45) Date of Patent: Apr. 4, 2006

(54) CURRENT CONTROL LOOP FOR ACTUATOR AND METHOD

(75) Inventors: Scott D. McMillan, Golden Valley, MN (US); Greg T. Mrozek, New Hope, MN (US)

(73) Assignee: Honeywell International Inc., Morristown, NJ (US)

(*) Notice: Subject to any disclaimer, the term of this patent is extended or adjusted under 35 U.S.C. 154(b) by 36 days.

(21) Appl. No.: 10/423,029

(22) Filed: Apr. 24, 2003

(65) Prior Publication Data

US 2004/0211200 A1 Oct. 28, 2004

(51) Int. Cl.
*F25D 17/04* (2006.01)
*H01H 47/00* (2006.01)

(52) U.S. Cl. .......................... 62/186; 361/152; 361/170
(58) Field of Classification Search ................ 62/186; 361/187, 170, 152, 153, 154, 155, 156
See application file for complete search history.

(56) References Cited

U.S. PATENT DOCUMENTS

| | | | |
|---|---|---|---|
| 4,423,364 A | | 12/1983 | Kompelien et al. |
| 4,439,139 A | | 3/1984 | Nelson et al. |
| 4,473,783 A | * | 9/1984 | Vermesse ..................... 388/823 |
| 4,572,333 A | | 2/1986 | Westley |
| 4,771,643 A | | 9/1988 | Mott |
| 4,985,666 A | * | 1/1991 | Nakabayashi ................ 318/434 |
| 5,182,498 A | | 1/1993 | Stuhr |
| 5,363,025 A | | 11/1994 | Colling |
| 5,373,205 A | * | 12/1994 | Busick et al. ................ 327/378 |
| 5,519,295 A | | 5/1996 | Jatnieks |
| 5,550,449 A | | 8/1996 | Ege et al. |
| 5,723,918 A | | 3/1998 | Schilling et al. |
| 5,986,369 A | | 11/1999 | Hanley et al. |
| 6,051,948 A | | 4/2000 | Vepy |
| 6,061,258 A | * | 5/2000 | Galbiati et al. .............. 363/98 |
| 6,249,100 B1 | | 6/2001 | Lange |
| 6,326,758 B1 | * | 12/2001 | Discenzo ..................... 318/609 |

(Continued)

FOREIGN PATENT DOCUMENTS

DE    3402759    8/1985

(Continued)

OTHER PUBLICATIONS

Belimo Model AF24-SR US, AFR24-SR US product information sheets, pp. 14-15, D20230 / 5 4 3 2 1 -05/02-10M-EG-Subject to change. © Belimo Aircontrols (USA), Inc.

(Continued)

*Primary Examiner*—Chen Wen Jiang
(74) *Attorney, Agent, or Firm*—Gregory M. Ansems

(57) ABSTRACT

Systems and methods for providing a current control loop for an actuator. A typical system includes a current command controller setting a command current, the current command controller being coupled to a drive circuit used to drive the actuator and a sampling module sampling a motor current of the actuator. The system also includes a summation module calculating a current error based on the motor current, the current error being calculated by subtracting the motor current from the command current. The current error is used to compensate for an error in the motor current of the actuator. The sampling module can include a switch and a capacitor coupled in parallel with the resistor when the switch is on, a charge on the capacitor being proportional to the voltage drop across the resistor. Methods for setting a maximum control current and for providing the current control loop are also illustrated.

5 Claims, 6 Drawing Sheets

U.S. PATENT DOCUMENTS 6,329,777 B1 * 12/2001 Itabashi et al. .............. 318/434
6,369,540 B1    4/2002 Lange et al.
6,373,207 B1    4/2002 Yablonovitch

FOREIGN PATENT DOCUMENTS

| DE | 4218782 | | 1/1993 |
|---|---|---|---|
| DE | 4234421 | | 4/1994 |
| JP | 2001258288 A | * | 9/2001 |
| JP | 2002070588 A | * | 3/2002 |
| WO | WO 98/39787 | | 9/1998 |
| WO | WO 03/061123 | | 7/2003 |

OTHER PUBLICATIONS

Kele Solutions product information sheets for *Siemens Spring Return Direct Coupled Actuators*, GMA, GCA Series; 2 pages; http://www.kele.com.

Pacific Liquid & Air Systems, Pumps—Motors—Controls; Article: *The Three Phase Induction Motor*, Author: Joe Evans, Ph.D., 6 pages; http://www.pacificliquid.com.

e-insite internet article; *Circuit Forms DC-Motor Switch with Brake*, edited by Bill Travis, authored by JB Guiot, DCS AG, Allschwil, Switzerland—EDN, Jan. 10, 2002. 2 pages; viewed Mar. 13, 2003 at e-insite website: http://www.e-insite.net/ednmag/index.asp?layout=article&articleid=CA189474.

Industrial Technology website: http//www.industrialtechnology.co.uk/1998/oct/siemens.html; viewed Mar. 13, 2003: *Electric Braking Techniques*, 2 pages.

Embedded.com website: http://www.embedded.com/2000/0008/0008spectra.htm; EmbeddedSystems Programming article: *Spectra Motor Rotation Control*, author: Don Morgan, viewed Feb. 29, 2003, 5 pages.

U.S. Appl. No. 10/422,877, filed Apr. 24, 2003, entitled: Spring Return Actuator for a Damper.

Horowitz et al., "The Art of Electronics," Cambridge University Press, ISBN 0-521-37095-7, XP002297359, pp 152, 153 and 219-221, 1998.

* cited by examiner

US 7,021,072 B2

CURRENT CONTROL LOOP FOR ACTUATOR AND METHOD

TECHNICAL FIELD

The present invention generally relates to actuators. In addition, the present invention relates to a current control loop for controlling torque produced by an actuator.

BACKGROUND

Actuators are commonly used in a variety of contexts to control devices. For example, actuators are used in heating, ventilating, and air-conditioning (HVAC) systems to actuate a variety of loads, such as opening and closing dampers and valves.

Typically, an actuator is designed with a rating that specifies a maximum torque at which the actuator is capable of actuating the load. Preferably, the actuator is capable of generating the rated maximum torque, but is also configured not to exceed the rated maximum torque. If the rated maximum torque is exceeded, it is possible for the actuator to damage the load and/or the gear train or linkage connected between the actuator shaft and the load.

It is also desirable to precisely control the positioning and velocity of the actuator as the actuator actuates a load from a first to a second position. Actuators can use one or more feedback loops to control the actuator during actuation. For example, some actuators use a positional feedback loop, which monitors a position of an actuator's motor relative to a desired end position. The error between the actuator's present position and the desired end position is calculated by a controller, which uses this error to direct the actuator's motor to the desired end position.

Other actuators employ a velocity feedback loop, which monitors a velocity at which an actuator's motor is currently operating. An error between the actuator's current velocity and desired velocity is calculated by a controller, which then uses this error to speed or slow the velocity of the actuator as desired.

A typical actuator used in an HVAC system includes a spring return to drive a load such as a damper or valve coupled to the actuator back to an initial or closed position. The spring return includes a spring that is wound by the actuator's motor as the actuator opens the damper, and the energy stored in this spring is used to return the damper to the initial position upon loss of power.

Further, some HVAC actuators (typically called modulating actuators) are configured to stop at positions between the fully closed and fully open stops. Such actuators must therefore develop sufficient torque to, for example, overcome the spring returns incorporated into the actuators, while opening or holding at the intermediate position short of the fully open stop.

Control of the rated maximum torque and positioning and velocity of an actuator can be complicated by variances in the tolerances between actuators, as well as by the need to overcome the spring return. In addition, control can be complicated by the necessity in modulating actuators to stop at intermediate positions between fully open and fully closed stops.

While the positional and velocity types of feedback control loops for actuators are sufficient for some applications, the prior art control designs for actuators do not always provide the desired efficiency and precise control needed. Therefore, it is desirable to provide new systems and methods for controlling the actuation of an actuator.

SUMMARY

The present invention generally relates to actuators. In addition, the present invention relates to a current control loop for controlling torque produced by an actuator.

In one aspect, the invention relates to systems and method for providing current control loops for actuators.

In another aspect, the invention relates to systems and methods for calibrating, sampling, and/or regulating a torque produced by an actuator, such as a maximum torque.

In preferred embodiments disclosed herein, the actuators are used as part of a heating, ventilating, and air-conditioning (HVAC) system.

The above summary of the present invention is not intended to describe each disclosed embodiment or every implementation of the present invention. Figures in the detailed description that follow more particularly exemplify embodiments of the invention. While certain embodiments will be illustrated and described, the invention is not limited to use in such embodiments.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example and the drawings, and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention generally relates to actuators. In addition, the present invention relates to a current control loop for controlling torque produced by an actuator. While the invention is not so limited, a greater understanding will be achieved through review of the following specification and attached drawings.

I. Actuator

Figure 1:
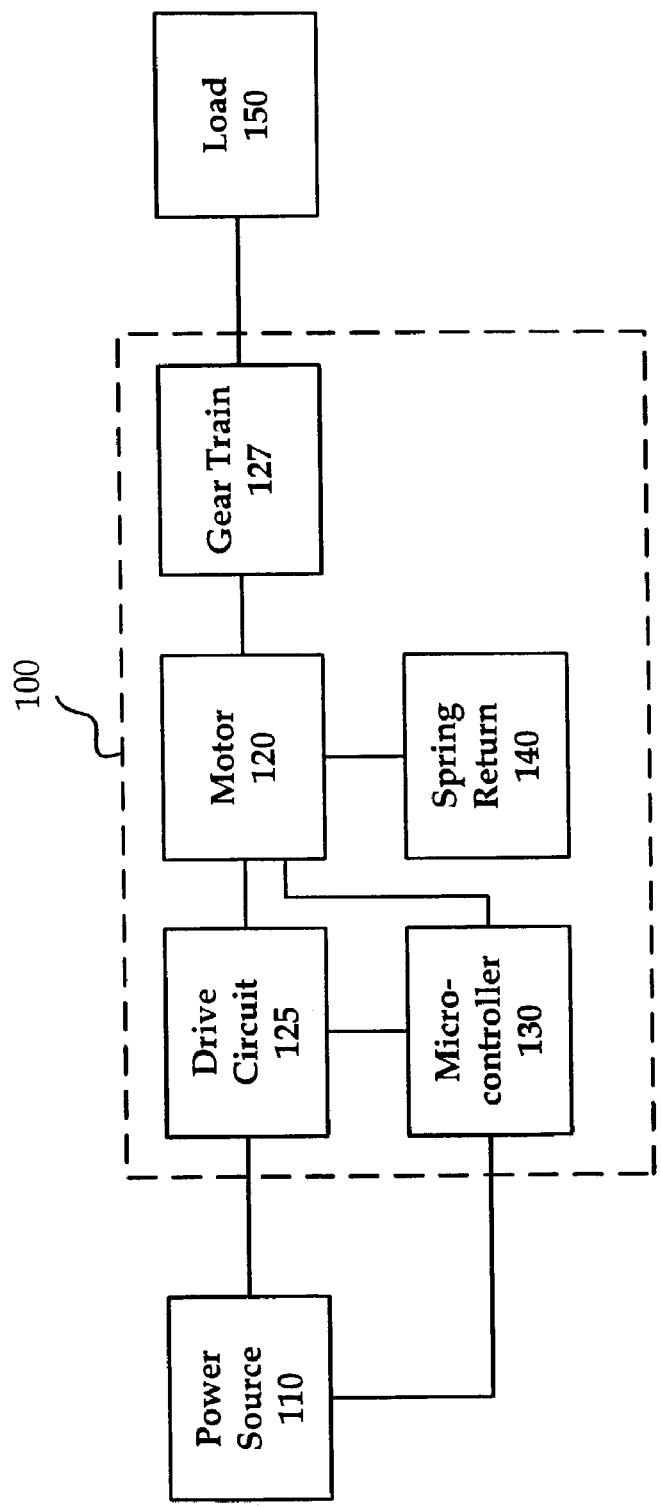
FIG. 1 is a block diagram illustrating an example system including an embodiment of an actuator coupled to a power source and load made in accordance with the present invention.

Referring to FIG. 1, an embodiment of a spring return actuator 100 is illustrated. The example spring return actuator 100 includes an electric motor 120 driven by a drive circuit 125, which is in turn powered by a power source 110. The example actuator 100 also includes a spring 140, which biases a load 150, coupled by a gear train 127 to the electric motor 120, to a first position. The example actuator 100 also includes a microcontroller 130 coupled to the drive circuit 125 and the electric motor 120 to commutate the electric motor. When power from the power source 110 to the actuator 100 fails, the spring 140 returns the load to the first position.

In the example shown, the actuator 100 and the load 150 are part of a heating, ventilating, and air-conditioning (HVAC) system, such as an HVAC system in a building or house. The load 150 can be, for example, a damper used to control airflow through one or more ventilation ducts, or a valve, such as a hydronic valve, used to control the flow of a liquid or gas through a pipe. The actuator 100 can be used to actuate the load 150 to one or more desired positions, such as to open and close the damper or valve.

II. Microcontroller, Drive Circuit, and Current Sampling Circuit

Figure 2:
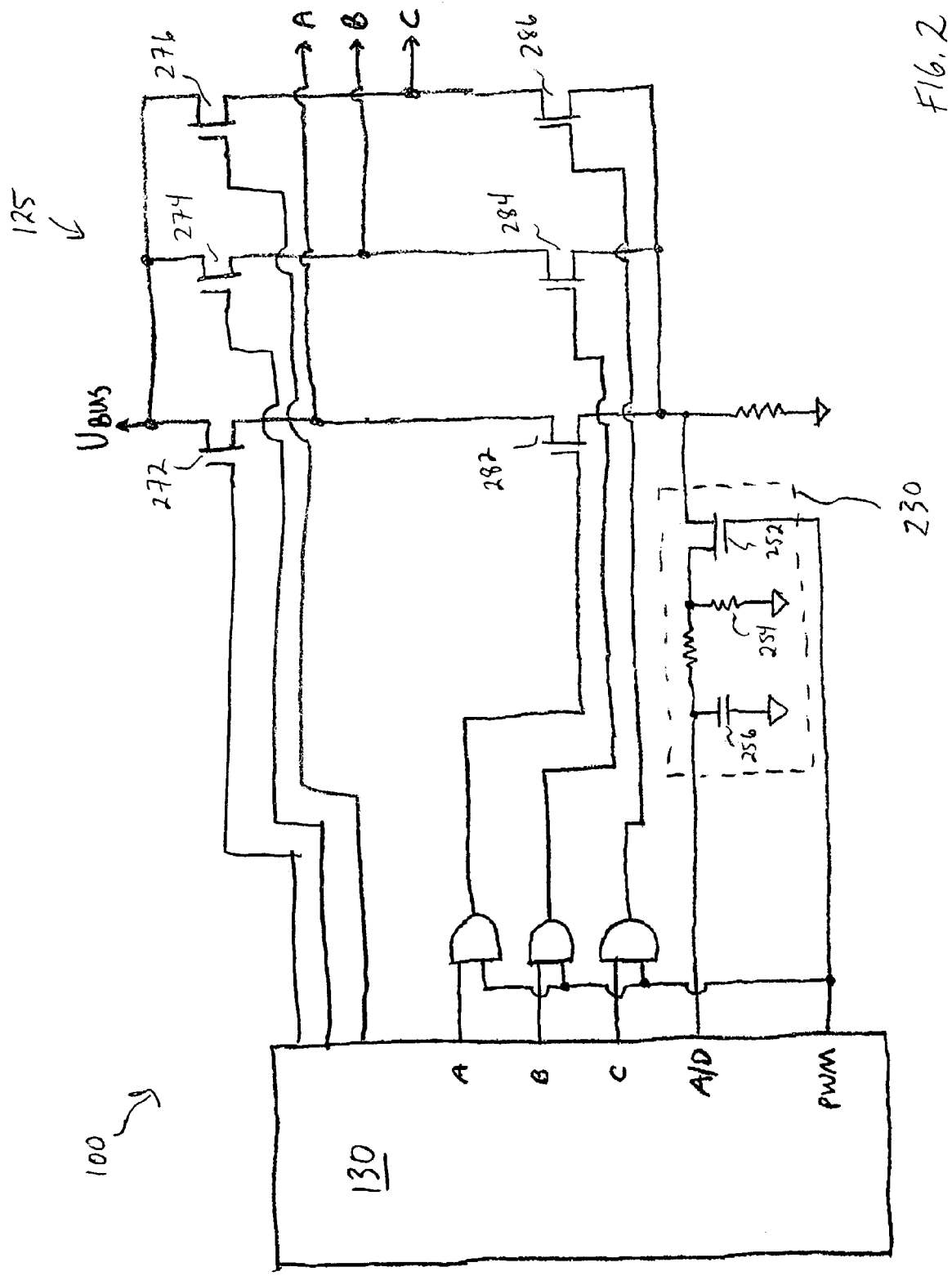
FIG. 2 is a schematic diagram of an example actuator including an example current sampling circuit made in accordance with the present invention.

Referring now to FIG. 2, various components of the actuator 100 are shown in detail. Generally illustrated are the drive circuit 125, the microcontroller 130, and a current sampling circuit 230.

The drive circuit 125 is coupled between the microcontroller 130 and the actuator's motor 120. The illustrated drive circuit 125 is coupled to coils A, B, and C of the motor 120. The drive circuit 125 alternates a direction of a current flowing through the coils A, B, and C to cause the motor 120 to spin and thereby generate torque.

The drive circuit 125 includes high-side switches 272, 274, and 276, as well as low-side switches 282, 284, and 286. By alternating the state of each of these switches (i.e. on or off), current flowing through the coils A, B, and C is switched. In the illustrated embodiment, the high-side switches 272, 274, and 276 are p-channel MOSFETs, and the low-side switches 282, 284, and 286 are n-channel MOSFETs, although other switching devices can also be used.

The microcontroller 130 preferably controls the state of each of the switches. For example, the microcontroller 130 can turn on high-side switch 272 and low-side switch 284 while turning off low-side switch 282 and high-side switch 274, thereby causing current to flow in a first direction through the coil or coils of the motor. The microcontroller 130 can then turn off high-side switch 272 and low-side switch 284 while turning on low-side switch 282 and high-side switch 274, thereby causing current to flow in a second, opposite direction through the coil or coils.

In a preferred embodiment, the microcontroller 130 includes a pulse width modulator (PWM) that uses pulse width modulation to drive the motor 120.

The actuator 100 also includes the current sampling circuit 230, which is configured to sample a motor current, or the current flowing through the coils A, B, and C of the motor 120. The torque of a motor is proportional to motor current (see Equation 3 below). Therefore, the sampled motor current can be used to calculate the torque of the motor 120.

Specifically, the circuit 230 includes a switch 252, and a resistor 254 and capacitor 256 coupled in parallel. The switch 252 is controlled by the PWM of the microcontroller 130 and is turned on during the duty cycle of the pulse width modulation and turned off during the cycling off of the pulse width modulation. When the switch 252 is turned on, the motor current flowing through the low-side switches 282, 284, and 286 is dissipated by the voltage drop across the resistor 254. The voltage drop across the resistor 254 is proportional to the motor current. The analog to digital (A/D) converter of the microcontroller 130 samples the charge on the capacitor 256.

The relationships expressed in the following equations (1)–(3) provided below are used by the microcontroller 130 to convert the sampled voltage charged on the capacitor 256 to motor torque.

$$\text{Charge on Capacitor 256} \approx \text{Voltage Drop Across Resistor 254} \quad (1)$$

$$\text{Voltage Drop Across Resistor 254} \approx \text{Motor Current} \quad (2)$$

$$\text{Motor Current} \approx \text{Motor Torque} \quad (3)$$

In this manner, the charge measured by the microcontroller 130 on the capacitor 256 can be used to calculate the torque generated by the motor.

It can be advantageous to measure the charge on the capacitor 256 rather than to directly measure the voltage drop across the resistor 254 so that a relatively slow and inexpensive A/D converter can be used. In addition, the circuit 230 is also advantageous in that it is unnecessary to synchronize sampling of the motor current with the PWM, since the charge is maintained on the capacitor 256 even during the cycling off of the duty cycle for the PWM.

Preferably, the A/D converter of the microcontroller 130 samples the motor current at intervals of 5 ms or less, more preferably between 1 and 2 ms.

Although the circuit 230 is disclosed herein, other circuits for sampling the motor current can also be used. For example, a faster A/D converter that is synchronized with the PWM can be used to directly measure the voltage drop across the resistor 254.

III. Current Control Loop

Figure 3:
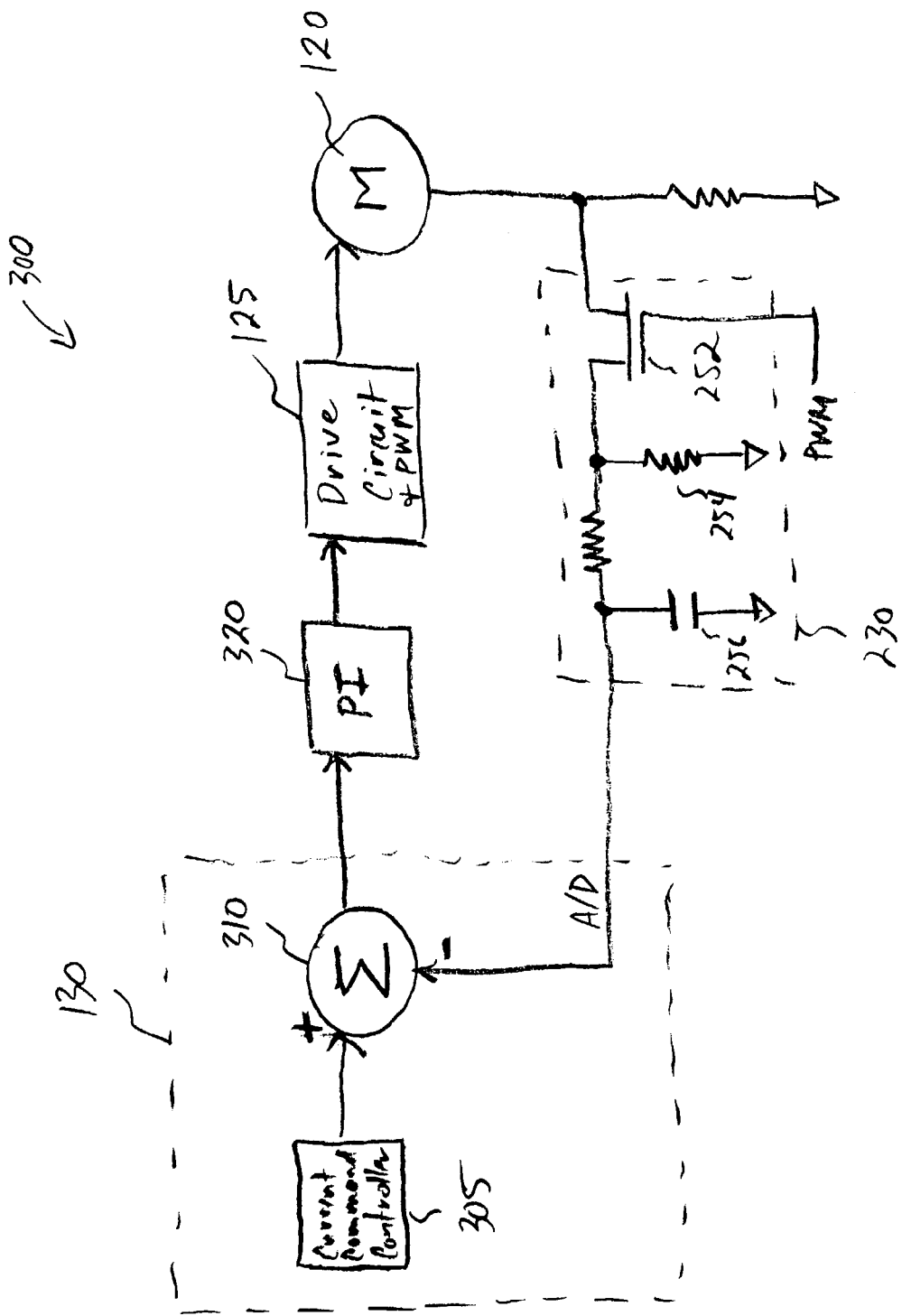
FIG. 3 is a schematic diagram of an example current control loop made in accordance with the present invention and incorporating the example current sampling circuit shown in FIG. 2.

Referring now to FIG. 3, a current control loop 300 for the actuator 100 is shown. The current control loop 300 generally includes a summation module 310 of the microcontroller 130, a proportional-integral filter 320, the drive circuit 125 and PWM, and the current sampling circuit 230.

Generally, the current control loop 300 functions as follows. A command current, typically generated by a current command controller 305 of the microcontroller 130, is provided to the summation module 310. The summation module 310 passes the command current to the proportional-integral filter 320, which converts the command current to a proportional voltage command. The voltage command is provided to control the duty cycle of the PWM, which in turn modulates the drive circuit 125 to drive the motor 120 at a desired torque.

While the motor 120 is being driven, the sampling circuit 230 samples the motor current of the motor by charging the capacitor 256 in proportion to the voltage drop across the resistor 254. The A/D converter of the microcontroller 130 is used to sample the charge on the capacitor 256, and the microcontroller thereby calculates the actual motor current. A current error is calculated by subtracting the motor current from the command current. This current error is then negatively summed by the summation module 310 with the command current, the output of which is then fed to the proportional-integral filter 320 to drive the motor as described above.

In this manner, the current control loop 300 functions to correct errors in the torque generated by the actuator.

IV. Methods of Setting and Utilizing a Maximum Command Current

Figure 4:
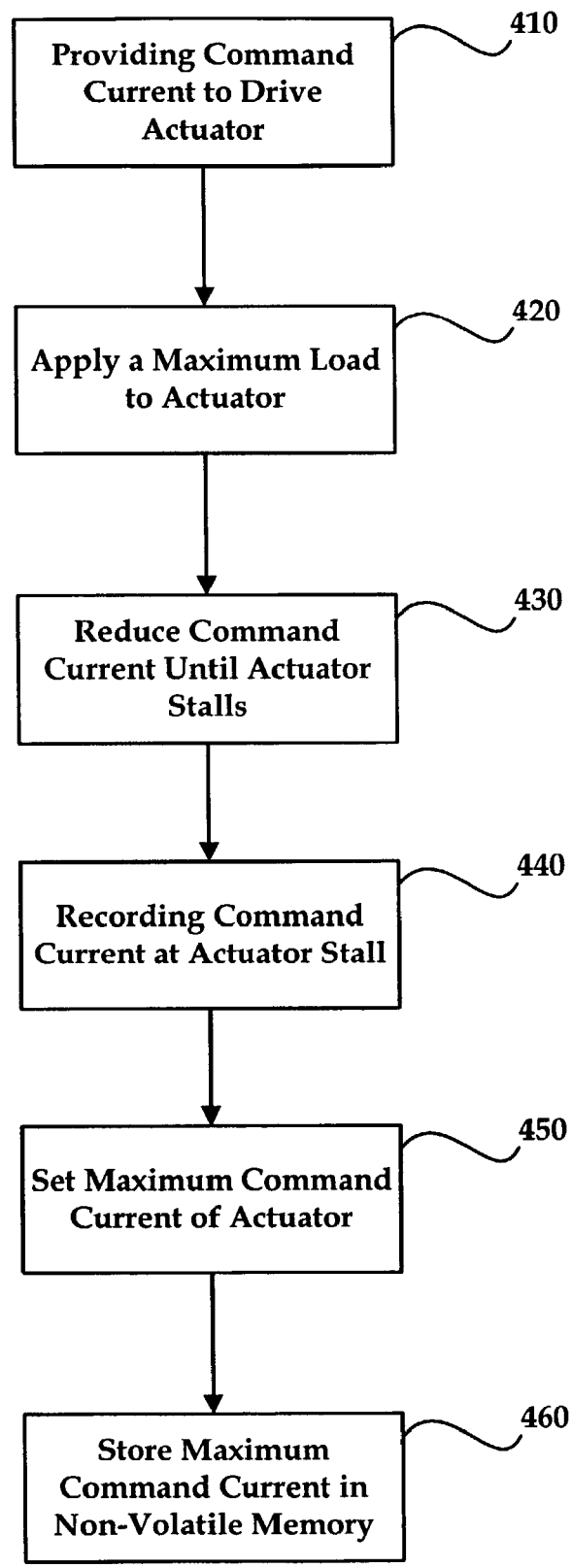
FIG. 4 is a flow diagram illustrating an example method for setting a maximum command current of an actuator in accordance with the present invention.
Figure 5:
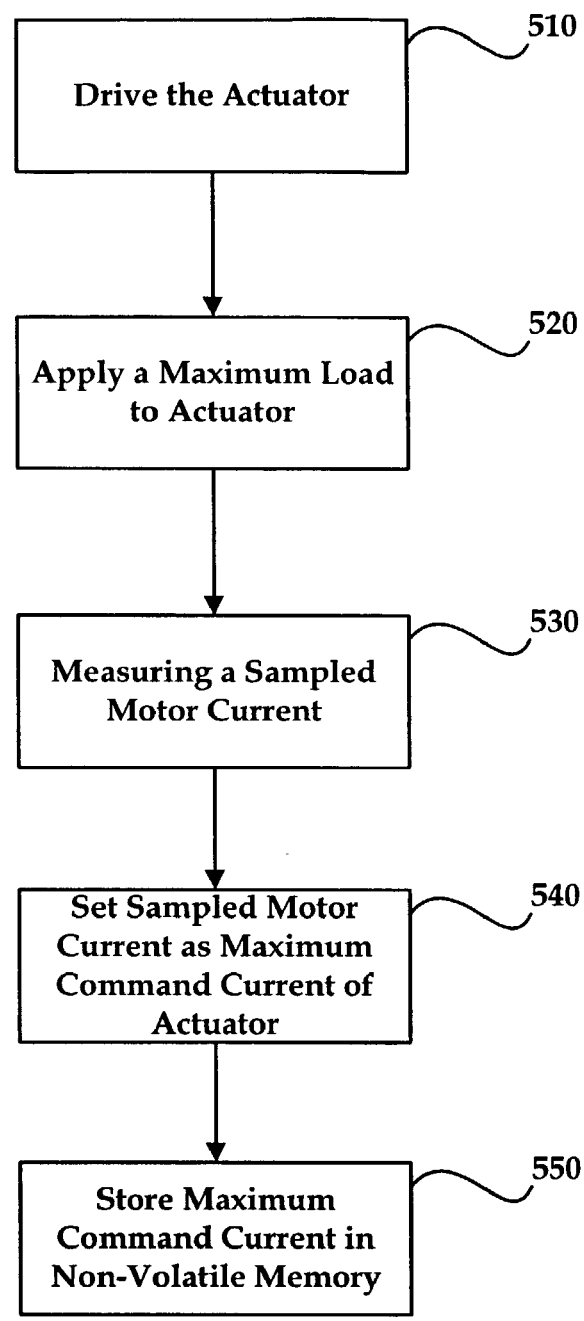
FIG. 5 is a flow diagram illustrating another example method for setting a maximum command current of an actuator in accordance with the present invention.

Referring now to FIGS. 4 and 5, example methods for setting a maximum command current for the actuator are shown. In each method, the calculated maximum command current can be used to control the maximum torque produced by the actuator.

In FIG. 4, a first method for setting the maximum command current starts by providing a command current to drive the actuator to produce a torque greater than a desired maximum torque at operation 410. With the motor being driven at this torque, a maximum load is applied to the actuator in operation 420. Next, in operation 430, the command current is reduced to a point at which the actuator stalls. Then, the command current at the point at which the actuator stalls is recorded in operation 440. Finally, the command current is set as a maximum command current of the actuator in operation 450, and the maximum command current can be stored in non-volatile memory in operation 460 so that the setting is not lost upon power-off of the actuator.

Referring now to FIG. 5, another method for setting the maximum command current is illustrated. In operation 510, the actuator is driven. Next, a desired maximum load is applied to the actuator in operation 520. In operation 530, the motor current of the actuator while the maximum load is being applied is measured using, for example, the current sampling circuit 230 described above. Next, the sampled motor current is set as the maximum command current of the actuator in operation 540. Finally, in operation 550 the maximum command current can be stored in non-volatile memory of the actuator.

It is advantageous to set the maximum command current according to one of the methods shown in FIGS. 4 and 5 so that a precisely-controlled maximum torque can be provided from unit to unit irrespective of electrical and mechanical differences from actuator to actuator. For example, greater than fifty percent of the torque generated by the actuator can be used just to overcome the force produced by the spring return. Therefore, small differences in the tolerances from actuator to actuator can result in large variations in torque produced by the actuator. The methods of FIGS. 4 and 5 provide an efficient method whereby each actuator can be calibrated in an efficient manner at the factory to reduce variations in mechanical and electrical tolerances so that a controlled maximum torque can be provided from unit to unit.

Figure 6:
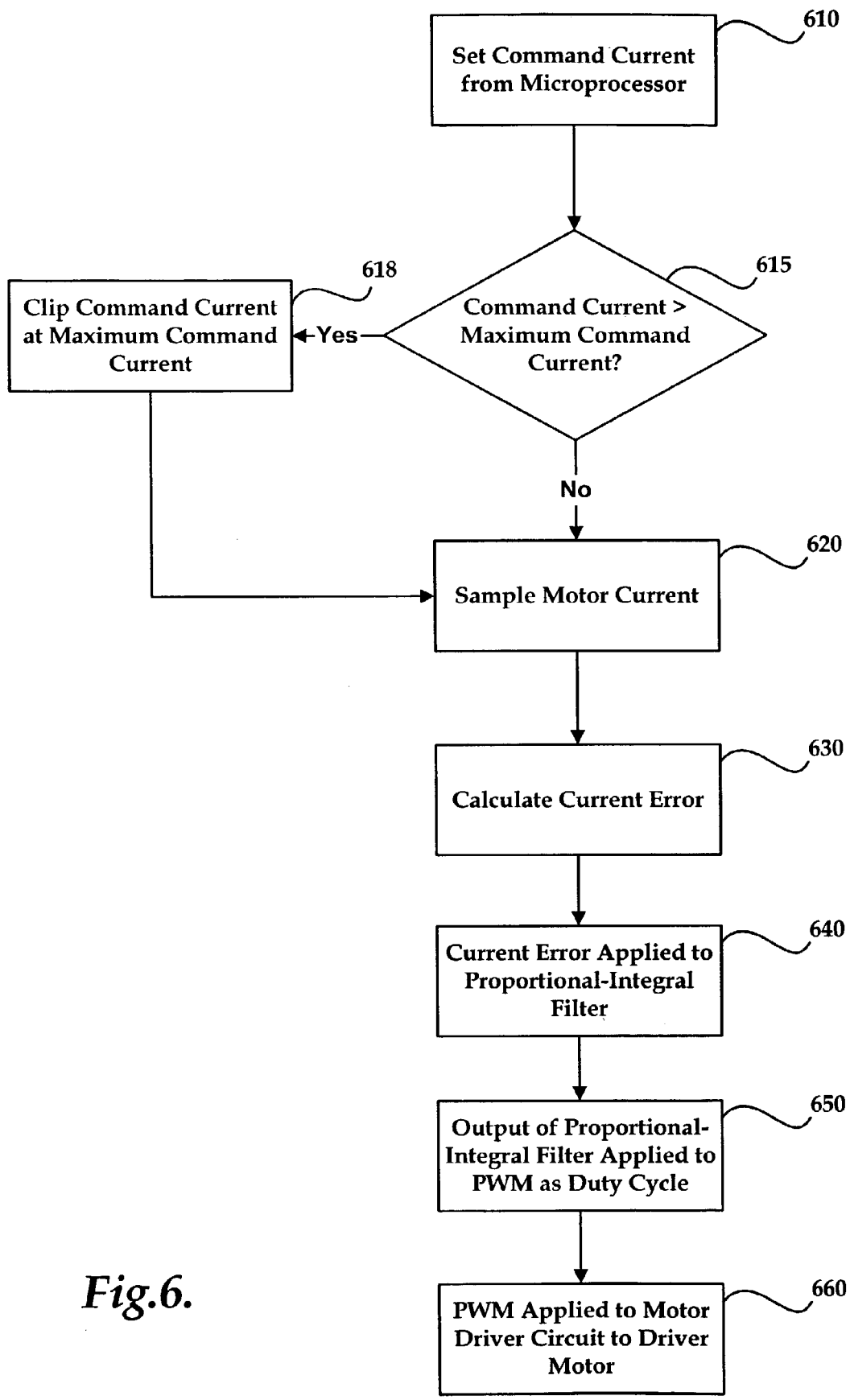
FIG. 6 is a flow diagram illustrating an example method for providing a current control loop clipped at a maximum command current in accordance with the present invention.

Referring now to FIG. 6, an example method is illustrated wherein the maximum command current is used in conjunction with the current control loop to clip the command current should it exceed the maximum command current (and thereby the desired maximum torque). In operation 610, the microcontroller sets a command current for the actuator. Next, in decisional operation 615 the microcontroller determines whether the command current is greater than the maximum command current. If the command current does not exceed the maximum command current, control is passed to operation 620. Alternatively, if the command current does exceed the maximum command current, control is passed to operation 618, in which the command current is clipped at the maximum command current, and control is then passed to operation 620.

In operation 620, the motor current is sampled using, for example, the circuit 230. In operation 630, the current error is calculated (by, for example, subtracting the motor current from the command current). Next, in operation 640 the current error is applied to a proportional-integral filter to control the system response. Next, in operation 650, the output of the proportional-integral filter is applied to the pulse width modulator as a duty cycle. Next, in operation 660, the pulse width modulator is applied to the motor drive circuit to control the voltage applied to the motor. This process is repeated at a regular interval.

In this manner, a current control loop is provided in which the motor current never exceeds the maximum command current because the command current is clipped at the maximum command current. Therefore, since the command current cannot exceed the maximum command current, the torque produced by the motor thereby reaches, but does not exceed, the maximum desired torque associated with the maximum command current.

By simply controlling the current command, maximum actuator torque is easily controlled. When used within a position control loop, the actuator will only provide enough current to hold the load against the internal spring load and/or external load. The motor current will remain equal to the command current regardless of changes in supply voltage to the motor.

The method illustrated in FIG. 6 thereby provides an efficient and accurate process for regulating the maximum torque provided by the actuator.

Although the example actuators shown herein are described in conjunction with the control of dampers of an HVAC system, the actuators can be used in a variety of other contexts to control various other devices.

The present invention should not be considered limited to the particular examples or materials described above, but rather should be understood to cover all aspect of the invention as fairly set out in the attached claims. Various modifications, equivalent processes, as well as numerous structures to which the present invention may be applicable will be readily apparent to those of skill in the art to which the present invention is directed upon review of the instant specification.

What is claimed is:

1. A current control loop for an actuator, comprising:
a current command controller setting a command current, the current command controller being configured to be coupled to a drive circuit used to drive the actuator,
a sampling module sampling a motor current of the actuator, wherein the sampling module comprises a resistor coupled in series with low-side switches of the drive circuit of the actuator, wherein a voltage drop across the resistor is proportional to the motor current, and wherein the sampling module further includes a switch and a capacitor coupled in parallel with the resistor when the switch is on, a charge on the capacitor being proportional to the voltage drop across the resistor;
a summation module calculating a current error based on the motor current, wherein the current error is calculated by subtracting the motor current from the command current, and wherein the current error is used to compensate for an error in the motor current of the actuator; and a limiter for limiting the command current so that the command current does not exceed a predetermined maximum command current value.

2. The current control loop of claim 1, further comprising a proportional-integral filter, wherein the current error is filtered by the proportional-integral filter and is thereby applied as a voltage command to increase a duty cycle of a pulse width modulated signal that is applied to the motor when the motor current is below the command current and to decrease the duty cycle of the pulse width modulated signal that is applied to the motor when the motor current is above the command current.

3. The current control loop of claim 2, further comprising a pulse width modulator for providing the pulse width modulated signal to the motor.

4. The current control loop of claim 1, wherein, the limiter is implemented by the current command controller such that if the command current exceeds the maximum command current, the current command controller clips the command current at the maximum command current.

5. The current control loop of claim 1, wherein the switch is turned on and off by a pulse width modulator used to drive the motor.

* * * * *